(12) United States Patent
Ramirez

(10) Patent No.: US 10,387,877 B2
(45) Date of Patent: Aug. 20, 2019

(54) METHOD AND SYSTEM FOR SECONDARY AUTHORIZATION PROCESSING

(71) Applicant: MasterCard International Incorporated, Purchase, NY (US)

(72) Inventor: Ariel Lopez Ramirez, Naucalpan de Juarez (MX)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 266 days.

(21) Appl. No.: 15/017,594

(22) Filed: Feb. 6, 2016

(65) Prior Publication Data

US 2017/0228730 A1   Aug. 10, 2017

(51) Int. Cl.
G06Q 20/40 (2012.01)
G06Q 20/10 (2012.01)

(52) U.S. Cl.
CPC ............. *G06Q 20/40* (2013.01); *G06Q 20/10* (2013.01)

(58) Field of Classification Search
CPC ................................ G06Q 20/40; G06Q 20/10
USPC ........................................................ 705/44
See application file for complete search history.

(56) References Cited

U.S. PATENT DOCUMENTS 6,915,279 B2 *   7/2005   Hogan ................. G06Q 20/02
                                                          705/39
9,367,843 B2 *   6/2016   Jurss .................. G06Q 20/40
2003/0120554 A1 * 6/2003 Hogan ................. G06Q 20/02
                                                          705/64
2012/0095918 A1 * 4/2012 Jurss .................. G06Q 20/40
                                                          705/44
2013/0179346 A1 * 7/2013 Kumnick .......... G06Q 20/40145
                                                          705/44

(Continued)

FOREIGN PATENT DOCUMENTS

WO        2013102210 A1     7/2013

OTHER PUBLICATIONS

International Search Report and Written Opinion issued by the International Search Authority dated Apr. 11, 2017 in corresponding PCT Application No. PCT/US2017/015744 (14 pages).

*Primary Examiner* — Hai Tran
(74) *Attorney, Agent, or Firm* — Buchanan Ingersoll & Rooney PC

(57) ABSTRACT

A method for performing value-added services using a secondary payment network includes: receiving a first authorization request via a first payment network including a first identifier indicating an acquirer as an originator and additional transaction data; generating a second authorization request including a second identifier indicating an issuer as an originator and the additional transaction data; transmitting the second authorization request via a second payment network; receiving the second authorization request via the second payment network modified to include value-added service data; determining approval or denial based on the value-added service data and additional transaction data; generating a first authorization response including a response code indicating the approval or denial and the additional transaction data; transmitting the first authorization response via the second payment network; receiving the first authorization response via the second payment network; and transmitting a second authorization response via the first payment network.

20 Claims, 6 Drawing Sheets

(56) References Cited

U.S. PATENT DOCUMENTS

2016/0019545 A1\* 1/2016 Vastenavondt ...... G06Q 20/227
705/44

\* cited by examiner

METHOD AND SYSTEM FOR SECONDARY AUTHORIZATION PROCESSING

FIELD

The present disclosure relates to secondary authorization processing for an electronic transaction, specifically the use of a secondary payment network to perform value-added services for an electronic transaction switched through a primary payment network.

BACKGROUND

Merchants and other entities involved in payment transactions often take advantage of various services provided by payment networks and other entities, such as value-added services that can enhance services provided by the merchant. For example, a payment network or associated entity may provide fraud-scoring, reward or loyalty programs, offer identification, and other value-added services to the merchant. In many instances, these services are provided during the processing of an electronic transaction, where the value-added services are applied at the payment network once the electronic transaction is routed to the payment network for processing.

However, in some instances a merchant or entity may desire value-added services provided by a payment network or associated entity that is different than the payment network primarily used by the merchant or entity in the processing of electronic transactions. For instance, a merchant may use a first payment network for electronic transaction switching, which may include performing processing related to authorization, clearing, and settlement of the transaction, but may desire to use a second payment network for a value-added service that the merchant wants to use to enhance the services provided to their customers. However, because electronic transactions involving the merchant are switched using the first payment network, the merchant and second payment network would be required to establish a new communication system and associated protocols. Furthermore, most payment networks and associated entities may be unable to perform value-added services outside of standard electronic transaction processing, requiring additional hardware and software development in order to provide such services when not operating as the switching payment network.

Thus, there is a need for a technical solution where a merchant and secondary payment network or other associated entity may be configured to communicate via established communication networks and protocols for transaction processing, while maintaining transaction switching being performed by a primary payment network, such that value-added services may be provided by the secondary payment network or other entity without modification to existing payment network topology and hardware. Such a technological solution may enable a merchant to avail itself to value-added services provided by any payment network, without an effect on their establishing switching payment network.

SUMMARY

The present disclosure provides a description of systems and methods for performing value-added services using a secondary payment network.

A method for performing value-added services using a secondary payment network includes: receiving, by a receiving device of a processing server, a first authorization request related to a payment transaction via a first payment network, wherein the first authorization request is a transaction message formatted pursuant to one or more standards including at least a message type indicator indicative of an authorization request and a plurality of data elements including at least a first data element configured to store a primary account number, a second data element configured to store a first identifier indicating an acquiring financial institution as an originator, and one or more additional data elements configured to store additional transaction data; generating, by a generation module of the processing server, a second authorization request related to the payment transaction, wherein the second authorization request is a transaction message formatted pursuant to one or more standards including at least a message type indicator indicative of an authorization or service request and a plurality of data elements including at least a first data element configured to store the primary account number, a second data element configured to store a second identifier indicating an issuing financial institution as an originator, and one or more additional data elements configured to store the additional transaction data; electronically transmitting, by a transmitting device of the processing server, the generated second authorization request via a second payment network; receiving, by the receiving device of the processing server, the second authorization request via the second payment network, wherein the second authorization request is modified to include at least a third data element configured to store data associated with one or more value-added services; determining, by a transaction processing module of the processing server, approval or denial of the related payment transaction based on at least one of: the data associated with the one or more value-added services stored in the third data element and the additional transaction data stored in the one or more additional data elements included in the modified second authorization request; generating, by the generation module of the processing server, a first authorization response related to the payment transaction, wherein the first authorization response is a transaction message formatted pursuant to one or more standards including at least a message type indicator indicative of an authorization response and a plurality of data elements including at least a first data element configured to store the primary account number, a second data element configured to store a response code indicating the determined approval or denial of the related payment transaction, and the one or more additional data elements configured to store additional transaction data; electronically transmitting, by the transmitting device of the processing server, the generated first authorization response via the second payment network; receiving, by the receiving device of the processing server, the generated first authorization response via the second payment network; and electronically transmitting, by the transmitting device of the processing server, a second authorization response related to the payment transaction via the first payment network.

A system for performing value-added services using a secondary payment network includes: a transaction processing module of a processing server; a receiving device of the processing server configured to receive a first authorization request related to a payment transaction via a first payment network, wherein the first authorization request is a transaction message formatted pursuant to one or more standards including at least a message type indicator indicative of an authorization request and a plurality of data elements including at least a first data element configured to store a primary account number, a second data element configured to store a first identifier indicating an acquiring financial institution as an originator, and one or more additional data elements configured to store additional transaction data; a generation module of the processing server configured to generate a second authorization request related to the payment transaction, wherein the second authorization request is a transaction message formatted pursuant to one or more standards including at least a message type indicator indicative of an authorization or service request and a plurality of data elements including at least a first data element configured to store the primary account number, a second data element configured to store a second identifier indicating an issuing financial institution as an originator, and one or more additional data elements configured to store the additional transaction data; and a transmitting device of the processing server configured to electronically transmit the generated second authorization request via a second payment network. The receiving device of the processing server is further configured to receive the second authorization request via the second payment network, wherein the second authorization request is modified to include at least a third data element configured to store data associated with one or more value-added services. The transaction processing module of the processing server is configured to determine approval or denial of the related payment transaction based on at least one of: the data associated with the one or more value-added services stored in the third data element and the additional transaction data stored in the one or more additional data elements included in the modified second authorization request. The generation module of the processing server is further configured to generate a first authorization response related to the payment transaction, wherein the first authorization response is a transaction message formatted pursuant to one or more standards including at least a message type indicator indicative of an authorization response and a plurality of data elements including at least a first data element configured to store the primary account number, a second data element configured to store a response code indicating the determined approval or denial of the related payment transaction, and the one or more additional data elements configured to store additional transaction data. The transmitting device of the processing server is further configured to electronically transmit the generated first authorization response via the second payment network. The receiving device of the processing server is further configured to receive the generated first authorization response via the second payment network. The transmitting device of the processing server is further configured to electronically transmit a second authorization response related to the payment transaction via the first payment network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
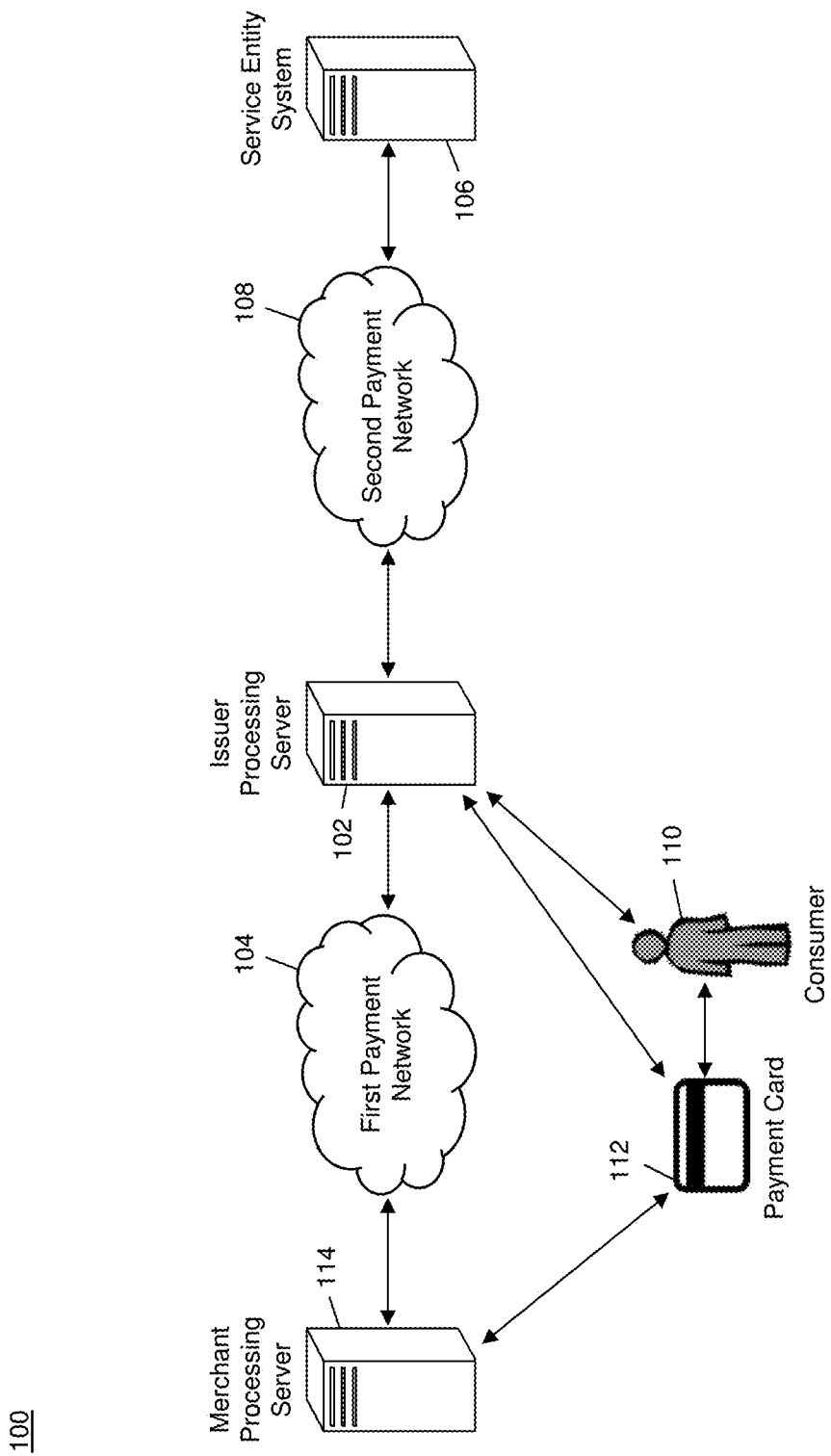
FIG. 1 is a block diagram illustrating a high level system architecture for performing value-added services in an electronic transaction using a secondary payment network in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Performing Value-Added Services Using a Secondary Payment Network

FIG. 1 illustrates a system 100 for the processing of electronic transactions including the use of value-added services where the electronic transaction is switched using a primary payment network with value-added services being provided via a secondary payment network.

The system 100 may include an issuer processing server 102. The issuer processing server 102, discussed in more detail below, may be a processing server associated with an issuing financial institution, such as an issuing bank, that is configured to issue transaction accounts to consumers for use in funding payment transactions. The issuer processing server 102 may be associated with a first payment network 104, which may be configured to perform switching for electronic transactions involving the issuer processing server 102. Also referred to herein as a "primary" payment network, the first payment network 104 may be configured to perform traditional functions of a payment network associated with the authorization, clearing, and settlement of electronic transactions, such as by routing transaction messages to and from the issuer processing server 102 using payment rails associated with the first payment network 104.

As part of the issuing and use of transaction accounts in payment transactions and other types of electronic transactions, the issuer processing server 102 may desire one or more value-added services. The value-added services may be performed by a service entity system 106, which may be associated with a second payment network 108. In some instances, the service entity system 106 may be a part of the second payment network 108, where the service entity system 106 may receive transaction messages for electronic transactions for use in performing value-added services via internal communication infrastructure of the second payment network 108. The second payment network 108, also referred to herein as a "secondary" payment network, may be configured to perform traditional functions of a payment network using payment rails associated with the second payment network 104, and may also be configured to assist in the performance of value-added services for electronic transactions via the service entity system 106.

Value-added services may include any services associated with electronic transactions that may be performed in addition to the minimum functions associated with authorization, clearing, and settlement of electronic transactions. For example, value-added services may include fraud scoring, fraud detection, transaction controls, account controls, budgeting, accounting, reward program management, offer distribution, offer redemption, transaction data tracking, etc. Additional value-added services that may be performed by a service entity system 106 as part of a payment or other electronic transaction will be apparent to persons having skill in the relevant art.

To avail itself of the value-added services provided by the service entity system 106, the issuer processing server 102 may be configured to mimic an acquiring financial institution with the second payment network 102 during a payment transaction switched via the first payment network 104. The issuer processing server 102 may issue a transaction account to a consumer 110 for use in funding payment transactions. As part of the issuing of the transaction account, the issuer processing server 102 may also issue a payment card 112 or other payment instrument to the consumer 110 that is associated with the transaction account. The payment card 112 may be encoded with payment details associated with the transaction account for use in funding payment transactions with the corresponding transaction account.

The consumer 110 may initiate a payment transaction with a merchant processing server 114, such as via a point of sale device. As part of the initiation of the payment transaction, the consumer 110 may present the payment card 112 to the merchant processing server 114 to convey the payment details encoded therein to the merchant processing server 114. The merchant processing server 114 may receive the payment details from the payment card 112 using any suitable method. For example, the merchant processing server 114 may read the payment details from a magnetic strip included in the payment card 112, may receive the payment details via an electronic transmission from the payment card 112 using near field communication, may read the payment details from a machine-readable code displayed on the payment card 112 or other computing device, etc. For remote transactions, such as conducted via the Internet, the merchant processing server 114 may receive the payment details via a web server or other communication method, such as may be entered by the consumer 110 via a computing device.

The merchant processing server 114 may receive the payment details and other transaction data associated with the payment transaction. The other transaction data may include any additional data associated with the transaction used in the processing of the payment transaction and performing of value-added services. Additional transaction data may include, for example, a transaction time, transaction date, transaction amount, geographic location, point of sale data, consumer data, merchant data, product data, offer data, loyalty data, reward data, etc. The merchant processing server 114 may then submit the payment details and transaction data to the issuer processing server 102 via the first payment network 104. In some instances, the payment details and transaction data may be submitted through an acquiring financial institution associated with the merchant processing server 114, such as an acquiring bank, and/or one or more additional entities, such as a gateway processor. In such instances, the intermediate entities may be configured to modify, supplement, and/or reformat the data. The merchant processing server 114 and/or intermediate entity or entities may be configured to include the payment details and additional transaction data in a transaction message submitted to the issuer processing server 102 via the first payment network 104 using the associated payment rails.

A transaction message may be a specially formatted data message that is formatted pursuant to one or more standards governing the exchange of financial transaction messages, such as the International Organization of Standardization's ISO 8583 standard. The transaction message may include a message type indicator indicative of a type of the transaction message, such as an authorization request, authorization response, service request, etc. The transaction message may also include a plurality of data elements, with each data element being configured to store payment details or other transaction data. The transaction message may further include one or more bitmaps, which may be configured to store data indicative of the data elements included in the transaction message and the data stored therein.

The merchant processing server 114 or other associated entity may electronically transmit a transaction message to the issuer processing server 102 via the payment rails of the first payment network 104 that includes a message type indicator indicative of an authorization request and data elements configured to store a primary account number read from the payment card 112, a transaction amount and other transaction data for the payment transaction, and an identifier indicating an acquiring financial institution associated with the merchant processing server 114 as an originator of the payment transaction. The acquiring financial institution may be an entity associated with the merchant processing server 114 configured to issue a transaction account to the merchant processing server 114 used to receive the funds paid as part of the payment transaction.

The first payment network 104 may route the transaction message to the issuer processing server 102 based on data included therein. For example, the primary account number stored in the corresponding data element included in the transaction message may include a bank identification number associated with the issuer processing server 102 for identification thereof. The issuer processing server 102 may receive the transaction message from the first payment network 104 via the associated payment rails. In a traditional payment transaction, such as discussed in more detail below with respect to the process 500 illustrated in FIG. 5, the issuer processing server 102 may approve or deny the payment transaction and return a response via the first payment network 104. In the system 100, the issuer processing server 102 may avail itself of one or more value-added services performed by the service entity system 106 prior to returning a response for the payment transaction.

To utilize the second payment network 108 for conveyance of a transaction message to the service entity system 106 for performing of the value-added services, the issuer processing server 102 may mimic being an acquiring financial institution for the payment transaction. The issuer processing server 102 may generate a new authorization request for the payment transaction where the issuer processing server 102 is indicated as an originator (e.g., acquirer) for the transaction. The new authorization request may be a transaction message with a message type indicator indicative of an authorization request and may include data elements configured to store the same transaction data as in the authorization request received from the merchant processing server 114, but with the issuer processing server 102 indicated as the originator of the payment transaction. The issuer processing server 102 may then submit this new authorization request to the second payment network 108 via the payment rails associated with the second payment network 108.

The second payment network 108 may receive the new authorization request for the payment transaction. As part of the processing of the authorization request, the second payment network 108 may route the authorization request to the service entity system 106 for the performing of one or more value-added services. In some instances, the performing of value-added services may include modification of data stored in one or more of the data elements included in the new authorization request. In such instances, modification of the data may include the inclusion of a response code in a corresponding data element that indicates approval or denial of the payment transaction. For example, the service entity system 106 may determine that the transaction is to be denied based on one or more value-added services, such as due to consumer transaction controls, fraud detection, etc. In other instances, the performing of value-added services may include the electronic transmission of a separate data signal to the issuer processing server 102, which may utilize the payment rails associated with the second payment network 108 or other suitable communication network and method.

Once the value-added services have been performed, the second payment network 108 may route the new authorization request (e.g., as modified, if applicable) to the issuer processing server 102 as the issuing financial institution for the payment transaction. The second payment network 108 may identify the issuer processing server 102 as the issuer due to the primary account number stored in the corresponding data element included in the authorization request, which may include a bank identification number associated with the issuer processing server 102. In some cases, the bank identification number may be the same bank identification number identified by the first payment network 104 used in identification of the issuer processing server 102 as the issuer in the payment transaction. In other cases, as discussed below, the issuer processing server 102 may be configured to modify or replace the primary account number in the new authorization request such that the second payment network 108 identifies a bank identification number included therein associated with the issuer processing server 102.

The issuer processing server 102 may receive the new authorization request from the second payment network 108 that is modified as per the value-added services performed by the service entity system 106. The issuer processing server 102 may then approve or deny the payment transaction using traditional methods. For example, the issuer processing server 102 may approve or deny the transaction based on an account balance for the transaction account being used to fund the payment transaction, based on a likelihood of fraud, and based on the result of the value-added services performed by the service entity system 106. For instance, if the service entity system 106 indicates that the transaction is to be denied, the issuer processing server 102 may accordingly deny the payment transaction. The issuer processing server 102 may generate a response transaction message for the payment transaction that includes a data element configured to store a response code that indicates if the transaction is approved or denied. In some instances, the response code may indicate a reason for the approval or denial. The response transaction message may also include a message type indicator indicative of an authorization response. The issuer processing server 102 may submit the authorization response to the second payment network 108 via the payment rails.

The second payment network 108 may receive the authorization response and may perform any functions associated therewith, which may include the forwarding of the authorization response to the service entity system 106 for use in continued performance of any value-added services. For example, the service entity system 106 may update transaction data, account limits, etc. based on if the payment transaction is approved or denied by the issuer processing server 102. Once the second payment network 108 has performed any necessary functions, the second payment network 108 may then route the authorization response back to the issuer processing server 102 via the associated payment rails as the originator of the corresponding authorization request, as the issuer processing server 102 had mimiced being an acquirer for the transaction.

After the issuer processing server 102 receives the authorization response from the second payment network 108, the issuer processing server 102 may generate a second authorization response as a response to the initial authorization request received via the first payment network 104 from the merchant processing server 114 or other associated entity. The second authorization response may include the data elements configured to store the transaction data for the payment transaction as included in the original authorization request, and may also include a data element configured to store a response code indicating approval or denial of the payment transaction. In some instances, the response code may be the same response code included in the first authorization response generated by the issuer processing server 102 and submitted to the second payment network 108. The second authorization response may also include an identifier indicating the acquiring financial institution associated with the merchant processing server 114 as the originator of the related authorization request. In some embodiments, the issuer processing server 102 may modify the authorization response received from the second payment network 108 to indicate the acquiring financial institution as the originator in place of the generation of a new transaction message.

The issuer processing server 102 may then submit the second authorization response to the first payment network 104 via the payment rails associated therewith. The first payment network 104 may route the second authorization response to the acquiring financial institution for delivery to the merchant processing server 114. The merchant processing server 114 may then finalize the payment transaction accordingly, such as by informing the consumer 110 of a denial or by furnishing the consumer 110 with the transacted-for goods or services if the transaction is approved.

In some embodiments, the mimicking of an acquiring financial institution as performed by the issuer processing server 102 may include the replacement of the primary account number included in the authorization request received from the first payment network 104 with a new primary account number. The new primary account number may be associated with the original primary account number, but may include a bank identification number associated with the issuer processing server 102 as identified by the second payment network 108. For example, the first payment network 104 and second payment network 108 may each have a different bank identification number associated with the issuer processing server 102, such that the issuer processing server 102 may swap the primary account number for one including the respective bank identification number depending on the payment network through which the corresponding transaction message is to be routed. As a result, authorizations submitted through the second payment network 108 for the value-added services may include the new primary account number, which may be replaced again by the original primary account number when the second authorization response is submitted to the first payment network 104 at the end of the processing of the payment transaction.

The methods and systems discussed herein may enable an issuer processing server 102 to avail itself of the value-added services performed by the service entity system 106, associated with the second payment network 108, while still having associated electronic transactions switched via the first payment network 104. By mimicing an acquirer and submitting a second authorization request for the payment transaction to the second payment network 108, the second payment network 108 and service entity system 106 may perform the value-added services without modifying the hardware or software associated therewith. The issuer processing server 102 may then, using this secondary authorization processing, receive the benefit of the value-added services and continue to utilize the first payment network 104 for switching by providing the authorization response for the payment transaction to the first payment network 104 following the secondary processing performed using the second payment network 108.

Issuer Processing Server

Figure 2:
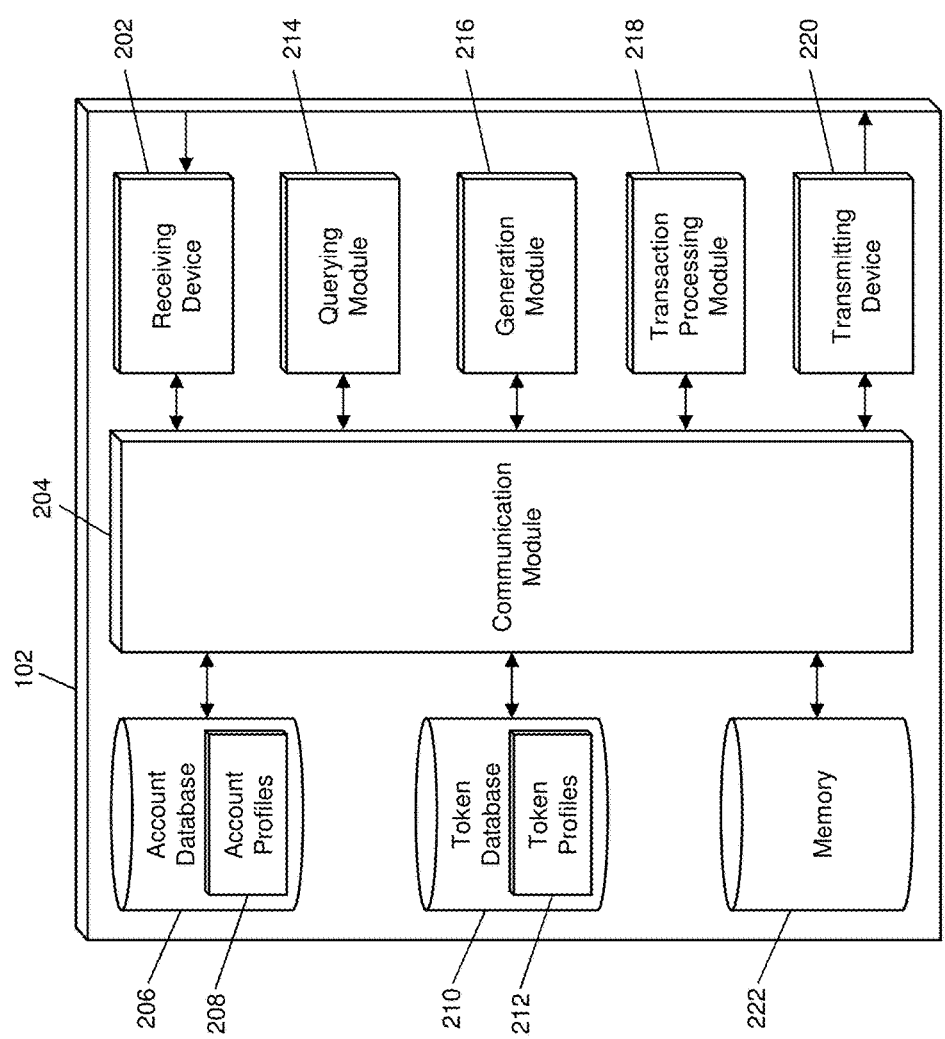
FIG. 2 is a block diagram illustrating the issuer processing server of FIG. 1 for the processing of an electronic transaction with value-added services performed using a secondary payment network in accordance with exemplary embodiments.

FIG. 2 illustrates an embodiment of the issuer processing server 102 of the system 100. It will be apparent to persons having skill in the relevant art that the embodiment of the issuer processing server 102 illustrated in FIG. 2 is provided as illustration only and may not be exhaustive to all possible configurations of the issuer processing server 102 suitable for performing the functions as discussed herein. For example, the computer system 600 illustrated in FIG. 6 and discussed in more detail below may be a suitable configuration of the issuer processing server 102.

The issuer processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 104 and 108 for the transmission of transaction messages that include sensitive financial data and information. In some instances, the receiving device 202 may also be configured to receive data from consumers 110, service entity systems 106, merchant processing servers 114, first payment network 104, second payment networks 108, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by first payment networks 104 and second payment networks 108 that may be superimposed with or otherwise include transaction messages for payment transactions. The transaction messages may be formatted pursuant to one or more standards, such as the ISO 8583 standard, and include message type indicators and a plurality of data elements. In some instances, the receiving device 202 may be configured to receive transaction messages both as an issuer for a payment transaction, as in transaction messages submitted through the first payment network 104 and second payment network 108, and as an acquirer for the payment transaction, as in transaction messages submitted through the second payment network 108 when mimicing an acquirer. The receiving device 202 may also be configured to receive data signals electronically transmitted by other computing devices for use in performing the traditional functions of an issuing financial institution, such as from consumer devices for management of transaction accounts.

The issuer processing server 102 may also include a communication module 204. The communication module 204 may be configured to transmit data between modules, engines, databases, memories, and other components of the issuer processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the issuer processing server 102 and external components of the issuer processing server 102, such as externally connected databases, display devices, input devices, etc. The issuer processing server 102 may also include a processing device. The processing device may be configured to perform the functions of the issuer processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, a generation module 216, a transaction processing module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The issuer processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account. Each account profile 208 may include at least a primary account number and an account balance. In some instances, the account profile 208 may also include additional information associated with the related transaction account, such as consumer information, communication details, transaction history, etc. In some instances, an account profile 208 may include multiple primary account numbers. For example, an account profile 208 may include a first primary account number that includes a bank identification number associated with the issuer processing server 102 used by the first payment network 104, and a corresponding second primary account number that includes a bank identification number associated with the issuer processing server 102 used by the second payment network 108. In some instances, the remainder of the first and second primary account numbers apart from the respective bank identification numbers may be equivalent.

In some embodiments, the issuer processing server 102 may also include a token database 210. The token database 210 may be configured to store a plurality of token profiles 212 using a suitable data storage format and schema. The token database 210 may be a relational database that utilizes structured query language for the storage, identification, modifying, updating, accessing, etc. of structured data sets stored therein. Each token profile 212 may be a structured data set configured to store data related to a transaction account. A token profile 212 may include a primary account number associated with the related transaction account that includes a bank identification number associated with the issuer processing server 102 used by the first payment network 104. The token profile 212 may also include a payment token associated with the primary account number that includes a bank identification number associated with the issuer processing server 102 used by the second payment network 108. In such embodiments, an account profile 208 related to the same transaction account as a token profile 212 may not include multiple primary account numbers.

The issuer processing server 102 may include a querying module 214. The querying module 214 may be configured to execute queries on databases to identify information. The querying module 214 may receive one or more data values or query strings, and may execute a query string based thereon on an indicated database, such as the account database 206, to identify information stored therein. The querying module 214 may then output the identified information to an appropriate engine or module of the issuer processing server 102 as necessary. The querying module 214 may, for example, execute a query on the account database 206 to identify an account profile 208 related to a transaction account used in a payment transaction based on a correspondence between the primary account number stored therein and the primary account number stored in a corresponding data element included in a received authorization request for the payment transaction.

The issuer processing server 102 may also include a generation module 216. The generation module 216 may be configured to receive one or more instructions for the generation of data, may generate the data, and may output the generated data to another module or engine of the issuer processing server 102. In some instances, instructions for the generation of data may be accompanied by data used in the generation. For example, the generation module 216 may be configured to generate transaction messages for payment transactions. The generation module 216 may be configured to generate authorization responses for responding to authorization requests, and may receive account profiles 208, token profiles 212, and/or authorization requests for use therein. The generation module 216 may also be configured to generate authorization requests for payment transactions where the issuer processing server 102 may be mimicing an acquirer, such as a second authorization request for a payment transaction where a first authorization request was received (e.g., via the receiving device 202) from the first payment network 104, where the second authorization request indicates the issuer processing server 102 as an originator of the authorization request.

The issuer processing server 102 may also include a transaction processing module 218. The transaction processing module 218 may be configured to perform the traditional functions of an issuer and/or acquirer associated with a payment transaction. For example, the transaction processing module 218 may receive an authorization request and related account profile 208 as input, may determine approval or denial of the corresponding payment transaction based thereon, and may output the determination to another module or engine of the issuer processing server 102. For instance, the determination may be output to the generation module 216 for use in generating a corresponding authorization response. Additional functions that may be performed by the transaction processing module 218 may be apparent to persons having skill in the relevant art.

The issuer processing server 102 may also include a transmitting device 220. The transmitting device 220 may be configured to transmit data over one or more networks via one or more network protocols. In some embodiments, the transmitting device 220 may be configured to transmit data over the payment rails, such as using specially configured infrastructure associated with payment networks 104 and 108 for the transmission of transaction messages that include sensitive financial data and information, such as identified payment credentials. In some instances, the transmitting device 220 may be configured to transmit data to consumers 110, service entity systems 106, merchant processing servers 114, first payment networks 104, second payment networks 108, and other entities via alternative networks, such as the Internet. In some embodiments, the transmitting device 220 may be comprised of multiple devices, such as different transmitting devices for transmitting data over different networks, such as a first transmitting device for transmitting data over the payment rails and a second transmitting device for transmitting data over the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 218 may be configured to electronically transmit data signals to first payment networks 104 and second payment networks 108 that may be superimposed with or otherwise include transaction messages for payment transactions. The transaction messages may be formatted pursuant to one or more standards, such as the ISO 8583 standard, and include message type indicators and a plurality of data elements. In some instances, the transmitting device 220 may be configured to electronically transmit transaction messages both as an issuer for a payment transaction, as in transaction messages submitted through the first payment network 104 and second payment network 108, and as an acquirer for the payment transaction, as in transaction messages submitted through the second payment network 108 when mimicing an acquirer. The transmitting device 220 may also be configured to electronically transmit data signals to other computing devices for use in performing the traditional functions of an issuing financial institution, such as to consumer devices for management of transaction accounts.

The issuer processing server 102 may also include a memory 222. The memory 222 may be configured to store data for use by the issuer processing server 102 in performing the functions discussed herein. The memory 222 may be configured to store data using suitable data formatting methods and schema and may be any suitable type of memory, such as read-only memory, random access memory, etc. The memory 222 may include, for example, currency and geographic location associations, encryption keys and algorithms, communication protocols and standards, data formatting standards and protocols, program code for modules and application programs of the processing device, and other data that may be suitable for use by the issuer processing server 102 in the performance of the functions disclosed herein as will be apparent to persons having skill in the relevant art.

Secondary Authorization Processing for Value-Added Services

Figure 3:
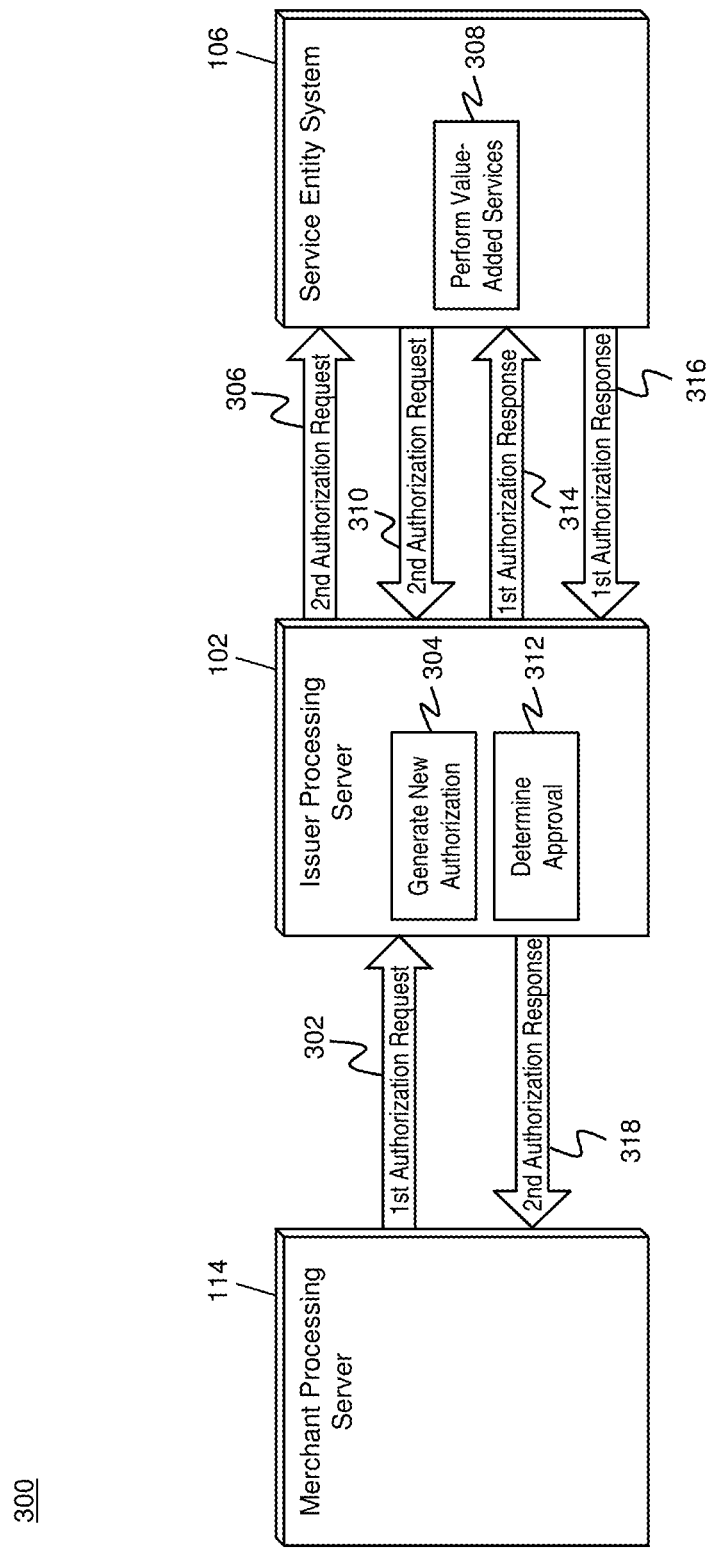
FIG. 3 is a flow diagram illustrating a process for the processing of an electronic transaction with value-added services performed using a secondary payment network using the system of FIG. 1 in accordance with exemplary embodiments.

FIG. 3 illustrates a process 300 for the processing of a payment transaction that includes secondary authorization processing using a secondary payment network 108 for the performing of value-added services for the payment transaction.

In step 302, the merchant processing server 114, or an entity associated therewith, such as an acquiring financial institution, may electronically submit a first authorization request for the payment transaction to the issuer processing server 102 via the first payment network 104 using the associated payment rails. The first authorization request may be a transaction message related to the payment transaction that includes a message type indicator indicative of an authorization request and a plurality of data elements including at least a first data element configured to store a primary account number associated with the payment card 112 presented for use in funding the related payment transaction, a second data element configured to store an identifier indicating an acquiring financial institution associated with the merchant processing server 114 as an originator of the related payment transaction, and one or more additional data elements configured to store additional transaction data. The identifier may be any type of suitable identification value, such as an identification number, which may also be a bank identification number. The additional transaction data may include, for example, a transaction time, transaction date, transaction amount, geographic location, consumer data, merchant data, point of sale data, product data, offer data, loyalty data, reward data, etc.

The receiving device 202 of the issuer processing server 102 may receive the first authorization request from the first payment network 104 and, in step 304, the generation module 216 of the issuer processing server 102 may generate a new, second authorization request 306 for the payment transaction. The second authorization request 306 may be a transaction message related to the payment transaction that includes a message type indicator indicative of an authorization request and including the same plurality of data elements as included in the first authorization request, with the second data element being changed to store an identifier that indicates the issuing financial institution associated with the issuer processing server 102 as an originator for the payment transaction. In embodiments where the second payment network 108 and first payment network 104 may have different bank identification numbers used for the issuer processing server 102, step 304 may also include replacing the primary account number stored in the first data element of the second authorization request with a second primary account number or payment token, such as may be identified (e.g., via the querying module 214 of the processing server 102) in an account profile 208 or token profile 212 related to the transaction account used in the payment transaction.

In step 306, the transmitting device 220 of the issuer processing server 102 may electronically transmit the second authorization request to the service entity system 106 via the second payment network 108 using the payment rails associated therewith. The service entity system 106 may receive the second authorization request 306 and, in step 308, may perform one or more value-added services. As part of the performance of the value-added services, the service entity system 106 may store data associated with the value-added services in a third data element included in the second authorization request 306. In some instances, the data associated with the value-added services may be a response code stored in a corresponding data element that indicates approval or denial of the payment transaction.

In step 310, the service entity system 106 may forward the modified second authorization request to the issuer processing server 102 via the payment rails associated with the second payment network 108, which may be received by the receiving device 202 of the issuer processing server 102. In step 312, the transaction processing module 218 of the issuer processing server 102 may determine approval of the payment transaction based on the transaction data stored in the additional data elements included in the first and second authorization requests, and the data associated with the value-added service or services performed by the service entity system 106 as included in the second authorization request. The generation module 216 of the issuer processing server 102 may generate a first authorization response in step 318 for the payment transaction based on the determination by the transaction processing module 218. The first authorization response may be a transaction message that includes a message type indicator indicative of an authorization response that includes the plurality of data elements included in the second authorization request as well as a third data element that includes a response code indicating if the transaction is approved or denied based on the determination by the transaction processing module 218. In some instances, the first authorization response may be a modification of the second authorization request to modify the message type indicator and, if applicable, to store the response code in the corresponding data element.

In step 314, the transmitting device 220 of the issuer processing server 102 may electronically transmit the first authorization response to the second payment network 108 via the associated payment rails, for rewarding to the service entity system 106. The service entity system 106 may perform any necessary functions related to the performed value-added services, and, in step 316, the first authorization response may be returned to the issuer processing server 102 from the second payment network 108 via the associated payment rails due to the identifier included therein indicating the issuer processing server 102 as the originator for the payment transaction.

In step 318, the transmitting device 220 of the issuer processing server 102 may electronically transmit a second authorization response to the merchant processing server 114 for the payment transaction through the first payment network 104 via the associated payment rails. The second authorization response may be a modification of the first authorization response by the issuer processing server 102 where the identifier stored in the second data element is modified to use the identifier associated with the acquiring financial institution. In some instances, the transmitting device 220 may transmit a second authorization response for the payment transaction that is newly generated by the generation module 216 of the issuer processing server 102, which may include the same plurality of data elements included in the first authorization request, but with a modified message type indicator that indicates an authorization response and a third data element configured to store the response code that indicates if the payment transaction is approved or denied based on the determination by the transaction processing module 218. Once the merchant processing server 114 receives the second authorization response, the payment transaction may be finalized, where the payment transaction is switched using the first payment network 104, but where value-added services were performed by the service entity system 106 associated with the second payment network 108 without modification to existing infrastructures of the merchant processing server 114, service entity system 106, or payment networks 104 and 108.

Figure 4:
FIG. 4 is a flow chart illustrating an exemplary method for performing value-added services using a secondary payment network in accordance with exemplary embodiments.

Exemplary Method for Performing Value-Added Services Using a Secondary Payment Network FIG. 4 illustrates a method 400 for the performing of value-added services for an electronic payment transaction via secondary authorization processing performed using a secondary payment network via the mimicking of an issuing financial institution as an acquirer.

In step 402, a first authorization request related to a payment transaction may be received by a receiving device (e.g., the receiving device 202) of a processing server (e.g., the issuer processing server 102) via a first payment network (e.g., the first payment network 104), wherein the first authorization request is a transaction message formatted pursuant to one or more standards including at least a message type indicator indicative of an authorization request and a plurality of data elements including at least a first data element configured to store a primary account number, a second data element configured to store a first identifier indicating an acquiring financial institution as an originator, and one or more additional data elements configured to store additional transaction data. In step 404, a second authorization request related to the payment transaction may be generated by a generation module (e.g., the generation module 216) of the processing server, wherein the second authorization request is a transaction message formatted pursuant to one or more standards including at least a message type indicator indicative of an authorization or service request and a plurality of data elements including at least a first data element configured to store the primary account number, a second data element configured to store a second identifier indicating an issuing financial institution as an originator, and one or more additional data elements configured to store the additional transaction data.

In step 406, the generated second authorization request may be electronically transmitted by a transmitting device (e.g., the transmitting device 220) of the processing server via a second payment network (e.g., the second payment network 108). In step 408, the second authorization request may be received by the receiving device of the processing server via the second payment network, wherein the second authorization request is modified to include at least a third data element configured to store data associated with one or more value-added services.

In step 410, approval or denial of the related payment transaction may be determined by a transaction processing module (e.g., the transaction processing module 218) of the processing server based on at least one of: the data associated with the one or more value-added services stored in the third data element and the additional transaction data stored in the one or more additional data elements included in the modified second authorization request. In step 412, a first authorization response related to the payment transaction may be generated by the generation module of the processing server, wherein the first authorization response is a transaction message formatted pursuant to one or more standards including at least a message type indicator indicative of an authorization response and a plurality of data elements including at least a first data element configured to store the primary account number, a second data element configured to store a response code indicating the determined approval or denial of the related payment transaction, and the one or more additional data elements configured to store additional transaction data.

In step 414, the generated first authorization response may be electronically transmitted by the transmitting device of the processing server via the second payment network. In step 416, the generated first authorization response may be received via the second payment network by the receiving device of the processing server. In step 418, a second authorization response related to the payment transaction may be electronically transmitted by the transmitting device of the processing server via the first payment network.

In one embodiment, the second authorization response may be a modification of the first authorization response to include a third data element configured to store the identifier indicating the acquiring financial institution as an originator. In some embodiments, the method 400 may further include generating, by the generation module of the processing server, the second authorization response, wherein the second authorization response is formatted pursuant to one or more standards including a message type indicator indicative of an authorization response and a plurality of data elements including at least a first data element configured to store the primary account number, a second data element configured to store the identifier indicating the acquiring financial institution as an originator, a third data element configured to store a response code indicating the determined approval or denial of the related payment transaction, and the one or more additional data elements configured to store additional transaction data.

In one embodiment, the processing server may be included in a computing system associated with the issuing financial institution. In some embodiments, the method 400 may further include storing, in an account database (e.g., the account database 206) of the processing server, an account profile (e.g., an account profile 208), wherein the account profile includes a structured data set related to a transaction account including at least a first primary account number associated with the first payment network and a second primary account number associated with the second payment network, wherein the primary account number stored in the first data element included in the first authorization request is the first primary account number, and the primary account number stored in the first data element included in the second authorization request and the first authorization response is the second primary account number. In a further embodiment, the second authorization response may be a modification of the first authorization response to include a third data element configured to store the identifier indicating the acquiring financial institution as an originator and to replace the primary account number stored in the first data element with the first primary account number.

In one embodiment, the primary account number may include a bank identification number associated with the issuing financial institution. In some embodiments, the first authorization request, second authorization request, and first authorization response may each further include a data element configured to store an identifier associated with the issuing financial institution as a receiving institution. In one embodiment, the one or more standards may include the ISO 8583 standard. In some embodiments, the data associated with one or more value-added services may include a response code indicating approval or denial, and the determination of approval or denial may be further based on the response code included in the data associated with the one or more value-added services.

Payment Transaction Processing System and Process

Figure 5:
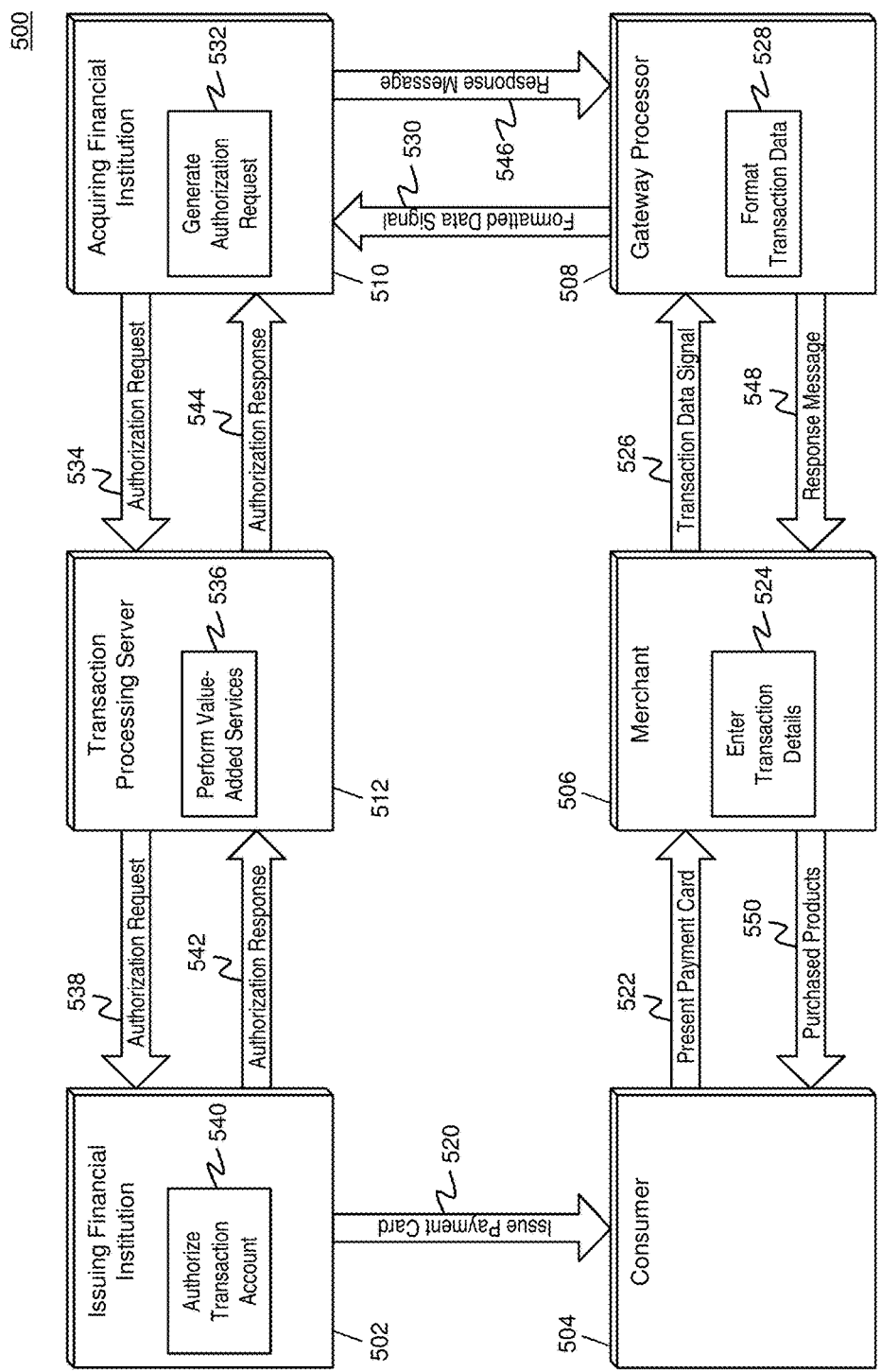
FIG. 5 is a flow diagram illustrating the processing of a payment transaction in accordance with exemplary embodiments.

FIG. 5 illustrates a transaction processing system and a process 500 for the processing of payment transactions in the system. The process 500 and steps included therein may be performed by one or more components of the system 100 discussed above, such as the issuer processing server 102, first payment network 104, service entity system 106, second payment network 108, consumer 110, payment card 112, merchant processing server 114, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIGS. 3 and 4, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing.

The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Computer System Architecture

Figure 6:
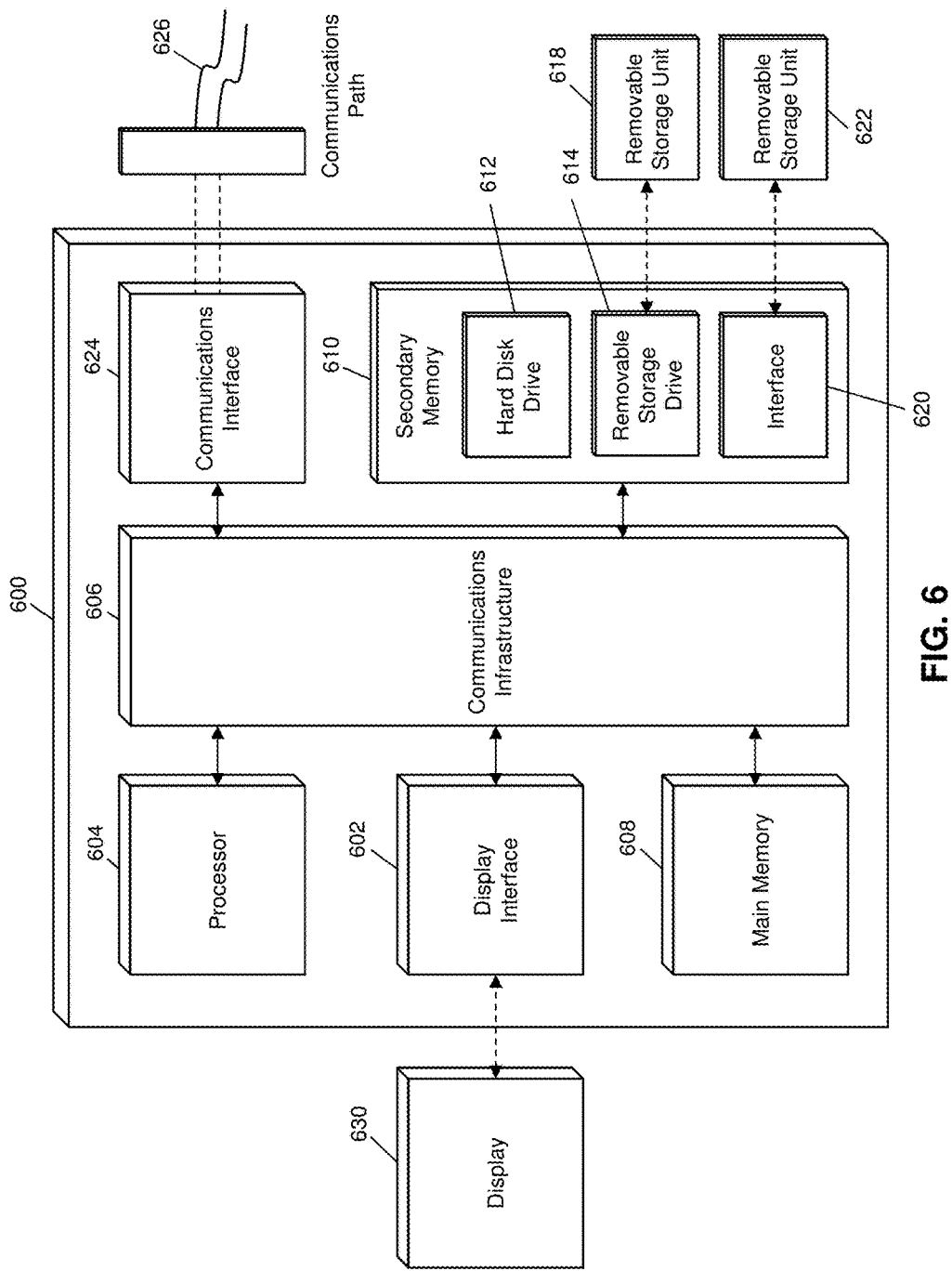
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the issuer processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for performing value-added services using a secondary payment network. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for performing value-added services using a secondary payment network, comprising:

receiving, by a receiving device of an issuer processing server, a first authorization request related to a payment transaction from a merchant processing server transmitted using infrastructure of a first payment network associated with the issuer processing server, wherein the first authorization request is a transaction message including at least a message type indicator indicative of an authorization request and a plurality of data elements including at least (i) a first data element including a primary account number, (ii) a second data element including a first identifier indicating an acquiring financial institution associated with the merchant processing server as an originator, and (iii) one or more additional data elements including additional transaction data;

in response to receiving the first authorization request, mimicking, by the issuer processing server, an acquiring financial institution by generating, by a generation module of the issuer processing server, a second authorization request related to the payment transaction, wherein the second authorization request is a transaction message including at least a message type indicator indicative of an authorization or service request and a plurality of data elements including at least (i) a first data element including the primary account number, (ii) a second data element including a second identifier indicating the issuer processing server as the originator, and (iii) one or more additional data elements including the additional transaction data;

electronically transmitting, by a transmitting device of the issuer processing server, the generated second authorization request to a service entity system using infrastructure of a second payment network associated with the service entity system;

receiving, by the receiving device of the issuer processing server, the second authorization request from the service entity system using the infrastructure of the second payment network, wherein the received second authorization request is modified to include at least a third data element including data associated with one or more value-added services;

determining, by a transaction processing module of the issuer processing server, approval or denial of the related payment transaction based on at least one of: the data associated with the one or more value-added services included in the third data element and the additional transaction data included in the one or more additional data elements included in the modified second authorization request;

generating, by the generation module of the issuer processing server, a first authorization response related to the payment transaction, wherein the first authorization response is a transaction message including at least a message type indicator indicative of an authorization response and a plurality of data elements including at least a first data element including the primary account number, a second data element including a response code indicating the determined approval or denial of the related payment transaction, and the one or more additional data elements including additional transaction data;

electronically transmitting, by the transmitting device of the issuer processing server, the generated first authorization response, to the service entity system, using the infrastructure of the second payment network associated with the service entity system;

receiving, by the receiving device of the issuer processing server, the generated first authorization response from the service entity system using the infrastructure of the second payment network; and electronically transmitting, by the transmitting device of the issuer processing server, a second authorization response related to the payment transaction to the merchant processing server using the infrastructure of the first payment network associated with the issuer processing server.

2. The method of claim 1, wherein the second authorization response is a modification of the first authorization response to include a third data element configured to store the identifier indicating the acquiring financial institution as the originator.

3. The method of claim 1, further comprising:
generating, by the generation module of the issuer processing server, the second authorization response, wherein the second authorization response includes a message type indicator indicative of an authorization response and a plurality of data elements including at least a first data element configured to store the primary account number, a second data element configured to store the identifier indicating the acquiring financial institution as an originator, a third data element configured to store a response code indicating the determined approval or denial of the related payment transaction, and the one or more additional data elements configured to store additional transaction data.

4. The method of claim 1, wherein the issuer processing server is included in a computing system associated with the issuing financial institution.

5. The method of claim 1, further comprising:
storing, in an account database of the issuer processing server, an account profile, wherein the account profile includes a structured data set related to a transaction account including at least a first primary account number associated with the first payment network and a second primary account number associated with the second payment network, wherein
the primary account number stored in the first data element included in the first authorization request is the first primary account number, and
the primary account number stored in the first data element included in the second authorization request and the first authorization response is the second primary account number.

6. The method of claim 5, wherein the second authorization response is a modification of the first authorization response to include a third data element configured to store the identifier indicating the acquiring financial institution as the originator and to replace the primary account number stored in the first data element with the first primary account number.

7. The method of claim 1, wherein the primary account number includes a bank identification number associated with the issuing financial institution.

8. The method of claim 1, wherein the first authorization request, second authorization request, and first authorization response each further includes a data element configured to store an identifier associated with the issuing financial institution as a receiving institution.

9. The method of claim 1, wherein the transaction message is formatted pursuant to one or more standards, the one or more standards including the ISO 8583 standard.

10. The method of claim 1, wherein
the data associated with one or more value-added services includes a response code indicating approval or denial, and
the determination of approval or denial is further based on the response code included in the data associated with the one or more value-added services.

11. A system for performing value-added services using a secondary payment network, comprising:
a transaction processing module of an issuer processing server;
a receiving device of the issuer processing server configured to receive, from a merchant processing server, a first authorization request related to a payment transaction transmitted using infrastructure of a first payment network associated with the issuer processing server, wherein the first authorization request is a transaction message including at least a message type indicator indicative of an authorization request and a plurality of data elements including at least (i) a first data element including a primary account number, (ii) a second data element including a first identifier indicating an acquiring financial institution, associated with the merchant processing server, as an originator, and (iii) one or more additional data elements including additional transaction data;

a generation module of the issuer processing server configured to generate, in response to receiving the first authorization request from the merchant processing server, a second authorization request related to the payment transaction in order to mimic an acquiring financial institution, wherein the second authorization request is a transaction message including at least a message type indicator indicative of an authorization or service request and a plurality of data elements including at least (i) a first data element including the primary account number, (ii) a second data element including a second identifier indicating the issuer processing server as the originator, and (iii) one or more additional data elements including the additional transaction data; and a transmitting device of the issuer processing server configured to electronically transmit the generated second authorization request to a service entity system using infrastructure of a second payment network associated with the service entity, wherein the receiving device of the issuer processing server is further configured to receive the second authorization request from the service entity system using the infrastructure of the second payment network, wherein the received second authorization request is modified to include at least a third data element including data associated with one or more value-added services, the transaction processing module of the issuer processing server is configured to determine approval or denial of the related payment transaction based on at least one of: the data associated with the one or more value-added services included in the third data element and the additional transaction data included in the one or more additional data elements included in the modified second authorization request, the generation module of the issuer processing server is further configured to generate a first authorization response related to the payment transaction, wherein the first authorization response is a transaction message including at least a message type indicator indicative of an authorization response and a plurality of data elements including at least a first data element including the primary account number, a second data element including a response code indicating the determined approval or denial of the related payment transaction, and the one or more additional data elements including additional transaction data;

the transmitting device of the issuer processing server is further configured to electronically transmit the generated first authorization response to the service entity system using the infrastructure of the second payment network associated with the service entity system, the receiving device of the issuer processing server is further configured to receive the generated first authorization response from the service entity system using the infrastructure of the second payment network, and the transmitting device of the issuer processing server is further configured to electronically transmit a second authorization response related to the payment transaction to the merchant processing server using the infrastructure of the first payment network associated with the issuer processing server.

12. The system of claim 11, wherein the second authorization response is a modification of the first authorization response to include a third data element configured to store the identifier indicating the acquiring financial institution as the originator.

13. The system of claim 11, wherein the generation module of the issuer processing server is further configured to generate the second authorization response, wherein the second authorization response includes a message type indicator indicative of an authorization response and a plurality of data elements including at least a first data element configured to store the primary account number, a second data element configured to store the identifier indicating the acquiring financial institution as the originator, a third data element configured to store a response code indicating the determined approval or denial of the related payment transaction, and the one or more additional data elements configured to store additional transaction data.

14. The system of claim 11, wherein the issuer processing server is included in a computing system associated with the issuing financial institution.

15. The system of claim 11, further comprising:
an account database of the issuer processing server configured to store an account profile, wherein the account profile includes a structured data set related to a transaction account including at least a first primary account number associated with the first payment network and a second primary account number associated with the second payment network, wherein
the primary account number stored in the first data element included in the first authorization request is the first primary account number, and
the primary account number stored in the first data element included in the second authorization request and the first authorization response is the second primary account number.

16. The system of claim 15, wherein the second authorization response is a modification of the first authorization response to include a third data element configured to store the identifier indicating the acquiring financial institution as the originator and to replace the primary account number stored in the first data element with the first primary account number.

17. The system of claim 11, wherein the primary account number includes a bank identification number associated with the issuing financial institution.

18. The system of claim 11, wherein the first authorization request, second authorization request, and first authorization response each further includes a data element configured to store an identifier associated with the issuing financial institution as a receiving institution.

19. The system of claim 11, wherein the transaction message is formatted pursuant to one or more standards, the one or more standards including the ISO 8583 standard.

20. The system of claim 11, wherein
the data associated with one or more value-added services includes a response code indicating approval or denial, and the determination of approval or denial is further based on the response code included in the data associated with the one or more value-added services.

* * * * *